(12) United States Patent
Yaworski

(10) Patent No.: US 12,431,700 B2
(45) Date of Patent: Sep. 30, 2025

(54) COLD-SHRINKABLE PROTECTIVE HOUSING AND METHODS INCLUDING SAME

(71) Applicant: TE Connectivity Solutions GmbH, Schaffhausen (CH)

(72) Inventor: Harry George Yaworski, Holly Springs, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 392 days.

(21) Appl. No.: 18/060,531

(22) Filed: Nov. 30, 2022

(65) Prior Publication Data

US 2024/0178645 A1    May 30, 2024

(51) Int. Cl.
| | |
|---|---|
| *H02G 15/184* | (2006.01) |
| *H01R 4/70* | (2006.01) |
| *H02G 15/18* | (2006.01) |
| *H02G 15/24* | (2006.01) |

(52) U.S. Cl.
CPC .......... *H02G 15/1833* (2013.01); *H01R 4/70* (2013.01); *H02G 15/184* (2013.01); *H02G 15/24* (2013.01)

(58) Field of Classification Search
CPC ...... H02G 15/013; H02G 15/04; H02G 15/24; H02G 15/182; H01R 4/70
See application file for complete search history.

(56) References Cited

U.S. PATENT DOCUMENTS

| | | | |
|---|---|---|---|
| 4,161,012 A | 7/1979 | Cunningham |
| 4,865,559 A | 9/1989 | Clabburn |
| 6,103,975 A | 8/2000 | Krabs et al. |
| 6,726,510 B2 | 4/2004 | Schad et al. |

(Continued)

FOREIGN PATENT DOCUMENTS

| | | |
|---|---|---|
| CN | 2627669 Y | 7/2004 |
| EP | 0087267 A1 | 8/1983 |

(Continued)

OTHER PUBLICATIONS

"HVE-1590 Series PILC Adapter For Use With 600 AMP Push-on Elbows" Raychem, Tyco Electronics-Energy, PII-55009 Rev AC, PCN 614371-000 (7 pages) (Apr. 26, 2000).

(Continued)

*Primary Examiner* — Vanessa Girardi

(57) ABSTRACT

An article includes a cold-shrinkable protective housing configured to be mounted on a terminated cable. The protective housing includes a housing body and an integral, tubular, electrically insulating rejacketing sleeve. The housing body includes a tubular cable leg, a tubular connector leg extending transversely to the cable leg, and a housing insulation layer formed of an electrically insulating elastomer. The rejacketing sleeve surrounds a portion of the cable leg. The connector leg defines a connector bore. The cable leg defines a cable entrance opening at a proximal end and a cable receiving bore extending from the cable entrance opening to the connector bore at a distal end. The cable receiving bore extends transversely to the connector bore. The rejacketing sleeve includes an extension section configured to extend or be extended in a proximal direction beyond the proximal end of the cable leg to surround a jacket of the cable.

20 Claims, 7 Drawing Sheets

(56) References Cited

U.S. PATENT DOCUMENTS

| | | |
|---|---|---|
| 7,059,879 B2 | 6/2006 | Krause et al. |
| 7,168,983 B2 | 1/2007 | Graf et al. |
| 7,331,806 B2 | 2/2008 | Stagi et al. |
| 7,431,599 B2 | 10/2008 | Luzzi |
| 7,476,114 B1 | 1/2009 | Contreras |
| 7,511,222 B2 | 3/2009 | Taylor et al. |
| 7,728,227 B2 | 6/2010 | Portas et al. |
| 7,863,521 B2 | 1/2011 | Campbell et al. |
| 7,901,243 B1 | 3/2011 | Yaworski |
| 7,938,682 B2 | 5/2011 | Su |
| 8,030,570 B2 | 10/2011 | Seraj et al. |
| 8,043,102 B2 | 10/2011 | Lu et al. |
| 8,454,376 B1 | 6/2013 | Siebens |
| 8,460,022 B2 | 6/2013 | Nguyen et al. |
| 8,502,076 B2 | 8/2013 | Luzzi |
| 8,602,800 B2 | 12/2013 | Borgstrom et al. |
| 8,889,989 B2 | 11/2014 | Maher |
| 9,293,872 B2 | 3/2016 | Mikli |
| 9,504,195 B2 | 11/2016 | Dinu et al. |
| 9,780,549 B2 * | 10/2017 | Yaworski ................ H01B 3/28 |
| 2009/0181583 A1 | 7/2009 | Krabs |

FOREIGN PATENT DOCUMENTS

| | | |
|---|---|---|
| EP | 0691721 A1 | 1/1996 |
| WO | 2009006136 A2 | 1/2009 |
| WO | 2017048592 A1 | 3/2017 |

OTHER PUBLICATIONS

"RSTI-L Screened, separable connection system 630 A up to 24 kV" Tyco Electronics Raychem GmbH, Energy Division, Tyco Electronics Corporation EPP 053 (4 pages) (Apr. 2004).

ELB-35-600, ELB-35-610 Product Installation Instructions, Raychem from TE Connectivity (12 pages) (Aug. 23, 2012).

ELB-35-600, ELB-35-610, 600A T-Body Elbow Connectors for Copper Tape (CT), Jacketed Concentric Neutral (JCN), and Concentric Neutral (CN) cables up to 35kV class TE Connectivity Energy, PII 55900, PCN BQ5477-000 (12 pages) (Sep. 28, 2011).

Raychem screened, separable connection system RSTI-68 800 A up to 42 kV, Tyco Electronics, available prior to Jul. 18, 2013.

Extended European Search Report. European Application No. 23213176. 3-1201, European Filing Date, Apr. 8, 2024.

* cited by examiner

COLD-SHRINKABLE PROTECTIVE HOUSING AND METHODS INCLUDING SAME

FIELD

The present invention relates to connectors and methods for forming electrical connections.

BACKGROUND

Elbow connection systems are used to connect medium and high voltage cables to equipment such as transformers and switchgear. The connection system includes a terminated cable assembly and a mating device (e.g., a bushing connector). The terminated cable assembly includes a housing and a connector. The cable is terminated with the connector. The connector and the cable are covered by the housing, which provides environmental protection, electrical insulation and electrical shielding for the cable and the connection. The housing includes a first leg defining a first bore, and a second leg extending crosswise to the first leg and defining second bore. The second bore intersects the first bore. The cable and connector are received in the first bore such that an end portion of the cable is surrounded by the first bore and a portion of the connector projects into the second bore. To form a connection with equipment, the mating device is received into the second bore to mate with the connector. A retainer device (e.g., a plug) may be provided to secure the mating device in the second bore.

Elbow terminated cable assemblies and elbow housings of this type are typically configured with L-shaped elbow housings (wherein the second leg projects from only one lateral side of the first leg) or with T-shaped elbow housings (wherein the second leg projects from opposed lateral sides of the first leg). This allows the cable to be mated to the equipment at an angle (e.g., a right angle) to the mating device.

Some known elbow housings are push on-type housings configured to be forcibly pushed onto the terminal cable. Other known elbow housings are cold-shrink elbow housings that are deployed from a holdout onto the terminated cable. Examples of known cold-shrink elbow connection systems are disclosed in U.S. Pat. Nos. 7,431,599 and 8,460,022, for example.

SUMMARY

According to some embodiments, an article includes a cold-shrinkable protective housing configured to be mounted on a terminated cable to form a terminated cable assembly. The terminated cable includes a cable and a connector. The cold-shrinkable protective housing includes a housing body and an integral, tubular, electrically insulating rejacketing sleeve. The housing body includes a tubular cable leg and a tubular connector leg extending transversely to the cable leg. The housing body includes a housing insulation layer formed of an electrically insulating elastomer. The rejacketing sleeve surrounds a portion of the cable leg. The connector leg defines a connector bore configured to receive the connector. The cable leg has a proximal end and an opposing distal end. The cable leg defines a cable entrance opening at the proximal end. The cable leg defines a cable receiving bore extending from the cable entrance opening to the connector bore at the distal end. The cable receiving bore extends transversely to the connector bore. The rejacketing sleeve includes an extension section configured to extend or be extended in a proximal direction beyond the proximal end of the cable leg to surround a jacket of the cable.

According to method embodiments, a method for forming a terminated cable assembly with a terminated cable, the terminated cable including a cable and a connector, includes providing a pre-expanded housing assembly unit including a holdout device and a cold-shrinkable protective housing. The protective housing including includes a housing body and an integral, tubular, electrically insulating rejacketing sleeve. The housing body includes a tubular cable leg and a tubular connector leg extending transversely to the cable leg, the housing body including a housing insulation layer formed of an electrically insulating elastomer. The rejacketing sleeve surrounds a portion of the cable leg. The connector leg defines a connector bore configured to receive the connector. The cable leg has a proximal end and an opposing distal end. The cable leg defines a cable entrance opening at the proximal end. The cable leg defines a cable receiving bore extending from the cable entrance opening to the connector bore at the distal end. The cable receiving bore extends transversely to the connector bore. The rejacketing sleeve includes an extension section configured to extend or be extended in a proximal direction beyond the proximal end of the cable leg to surround a jacket of the cable. The holdout device is removably mounted within the cable receiving bore and is operative to maintain the cable leg in a radially expanded state until removed from the cable receiving bore. The method further includes: inserting the terminated cable into the cable receiving bore through the cable entrance opening: thereafter removing the holdout device from the cable receiving bore to permit the cable leg to elastically radially contract onto the cable: and extending the extension section to surround the jacket of the cable.

According to some embodiments, an article includes a cold-shrinkable protective housing configured to be mounted on a terminated cable to form a terminated cable assembly. The terminated cable including a cable and a connector. The cold-shrinkable protective housing includes a housing body a housing body including a tubular cable leg and a tubular connector leg extending transversely to the cable leg. The housing body includes: a housing insulation layer formed of an electrically insulating elastomer: a tubular stress cone layer bonded to an inner surface of the housing insulation layer and formed of an electrically conductive elastomer: and a tubular outer semiconductive layer bonded to an outer surface of the housing insulation layer, the outer semiconductive layer being formed of an electrically semiconductive elastomer. The connector leg defines a connector bore configured to receive the connector. The cable leg has a proximal end and an opposing distal end. The cable leg defines a cable entrance opening at the proximal end. The cable leg defines a cable receiving bore extending from the cable entrance opening to the connector bore at the distal end. The cable receiving bore extends transversely to the connector bore. The stress cone layer defines a portion of the cable receiving bore. The stress cone layer is configured to engage and surround a terminal edge of a semiconductive layer of the cable.

According to some method embodiments, a method for forming a terminated cable assembly with a terminated cable, the terminated cable including a cable and a connector, includes providing a pre-expanded housing assembly unit including a a holdout device and a cold-shrinkable protective housing. The protective housing includes a housing body including a tubular cable leg and a tubular connector leg extending transversely to the cable leg. The housing body includes: a housing insulation layer formed of an electrically insulating elastomer: a tubular stress cone layer bonded to an inner surface of the housing insulation layer and formed of an electrically conductive elastomer: and a tubular outer semiconductive layer bonded to an outer surface of the housing insulation layer, the outer semiconductive layer being formed of an electrically semiconductive elastomer. The connector leg defines a connector bore configured to receive the connector. The cable leg has a proximal end and an opposing distal end. The cable leg defines a cable entrance opening at the proximal end. The cable leg defines a cable receiving bore extending from the cable entrance opening to the connector bore at the distal end. The cable receiving bore extends transversely to the connector bore. The stress cone layer defines a portion of the cable receiving bore. The stress cone layer is configured to engage and surround a terminal edge of a semiconductive layer of the cable. The holdout device is removably mounted within the cable receiving bore and is operative to maintain the cable leg in a radially expanded state until removed from the cable receiving bore. The method further includes: inserting the terminated cable into the cable receiving bore through the cable entrance opening: and thereafter removing the holdout device from the cable receiving bore to permit the cable leg to elastically radially contract onto the cable.

DETAILED DESCRIPTION

Figure 1:
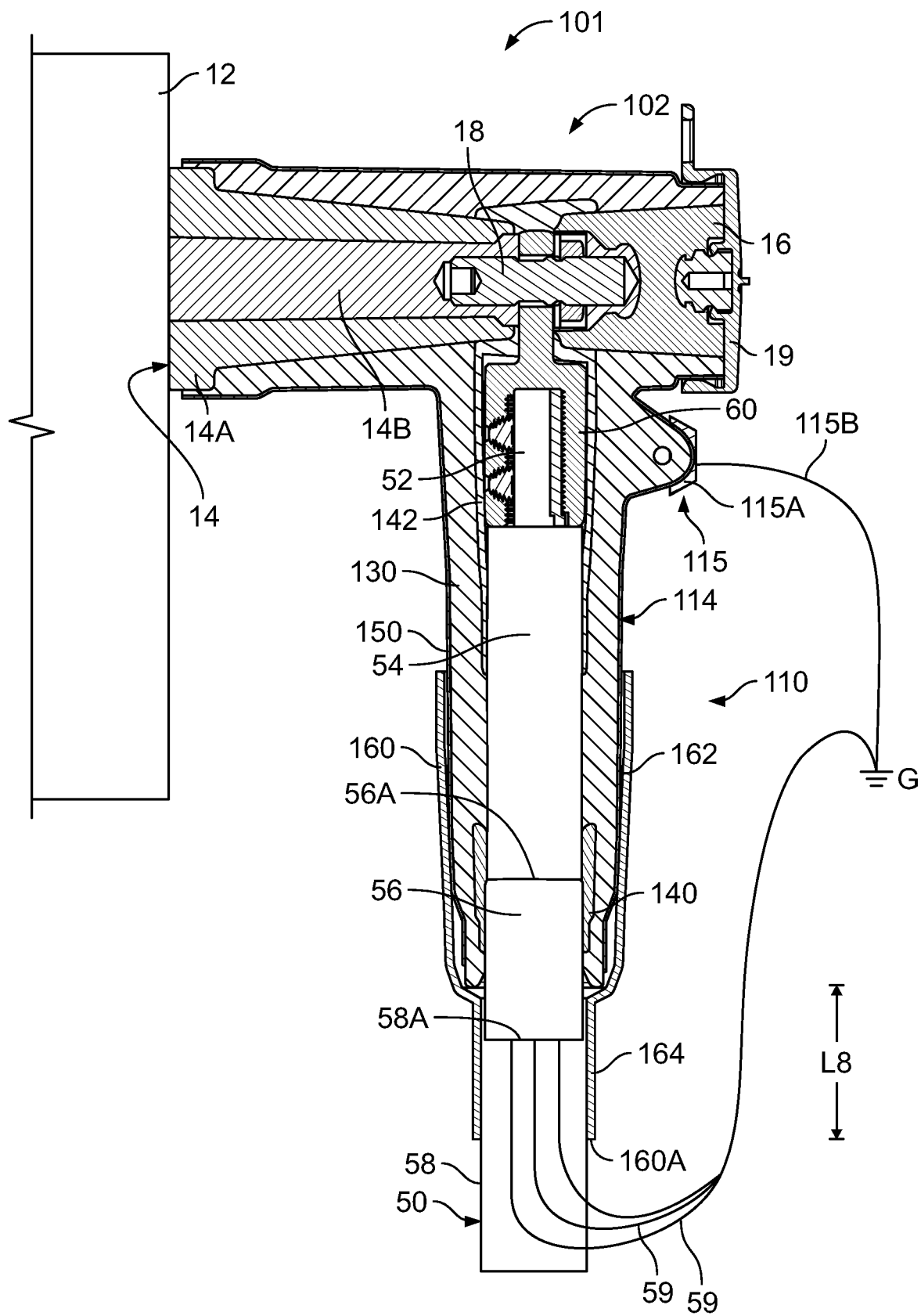
FIG. 1 is a cross-sectional view of a connection system including a protective housing according to some embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein: rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams (i.e., seamless).

With reference to FIG. 1, a connection system 101 according to some embodiments of the technology is shown therein. The connection system 101 includes a terminated cable assembly 102 according to some embodiments. The example connection system 101 also includes a mating (equipment) connector 14, a retainer 16, an electrical contact member 18, and an electrically conductive cap 19. The cable connection system 101 may be used to terminate and environmentally protect an electrical cable 50 (in some embodiments, an electrical power transmission cable) and to enable physical and electrical connection between the cable 50 and a termination (e.g., the bushing 14) of associated electrical equipment 12, for example.

The example mating connector is a connection bushing 14 having a body 14A and a female electrical contact 14B. However, it will be appreciated that the mating device 14 may be provided in different configurations (e.g., with a male electrical contact).

As described in more detail below, the terminated cable assembly 102 includes the cable 50, an electrical termination or cable connector 60, and a protective connector adapter, cover assembly or housing 110.

The protective housing 110 is a cold-shrink or cold-shrinkable cover or housing, meaning that it is configured and constructed to shrink or retract about the cable 50 without requiring the use of applied heat.

Figure 3:
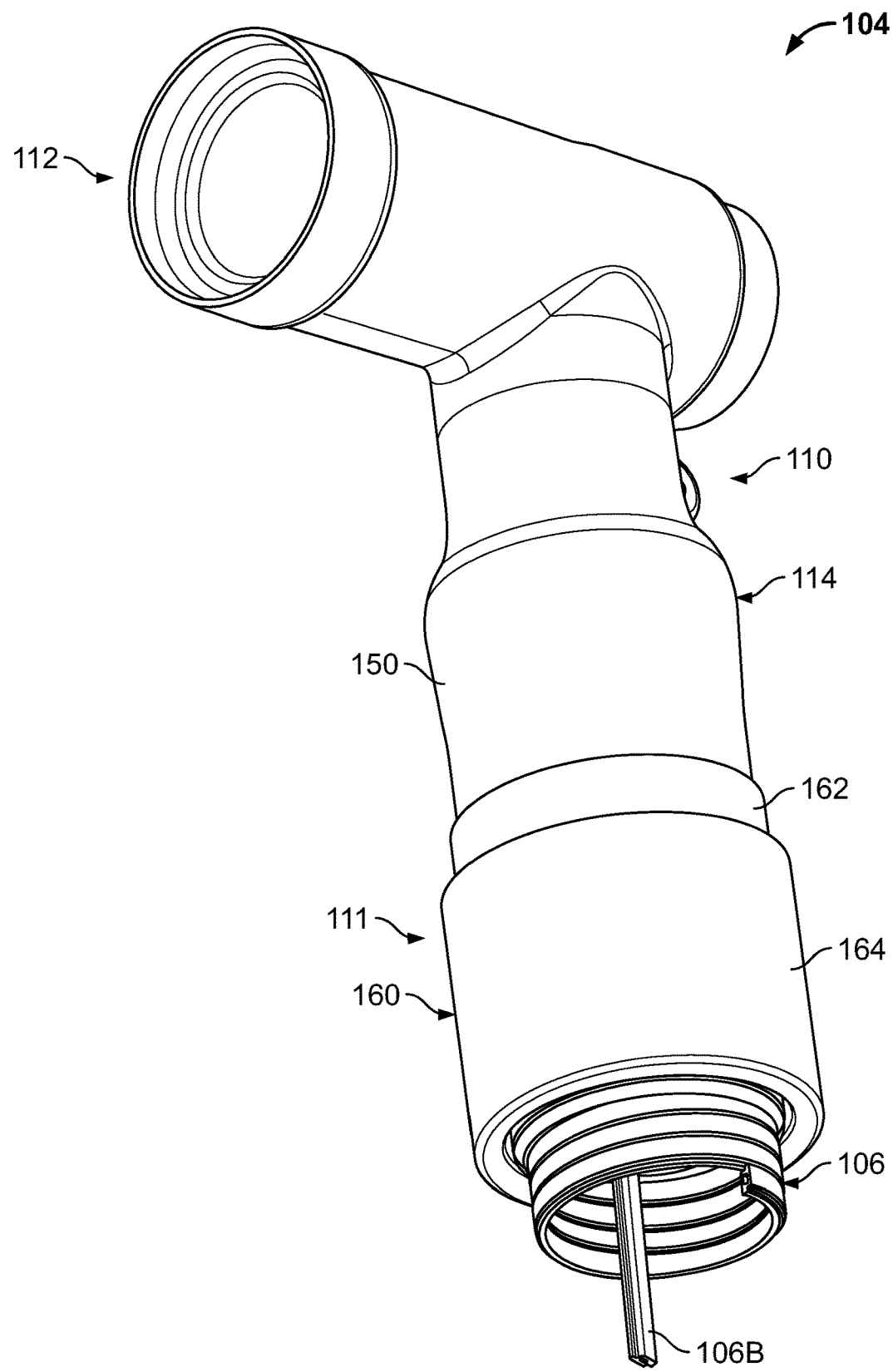
FIG. 3 is a perspective view of pre-expanded housing assembly unit according to some embodiments including the protective housing of FIG. 1.
Figure 6:
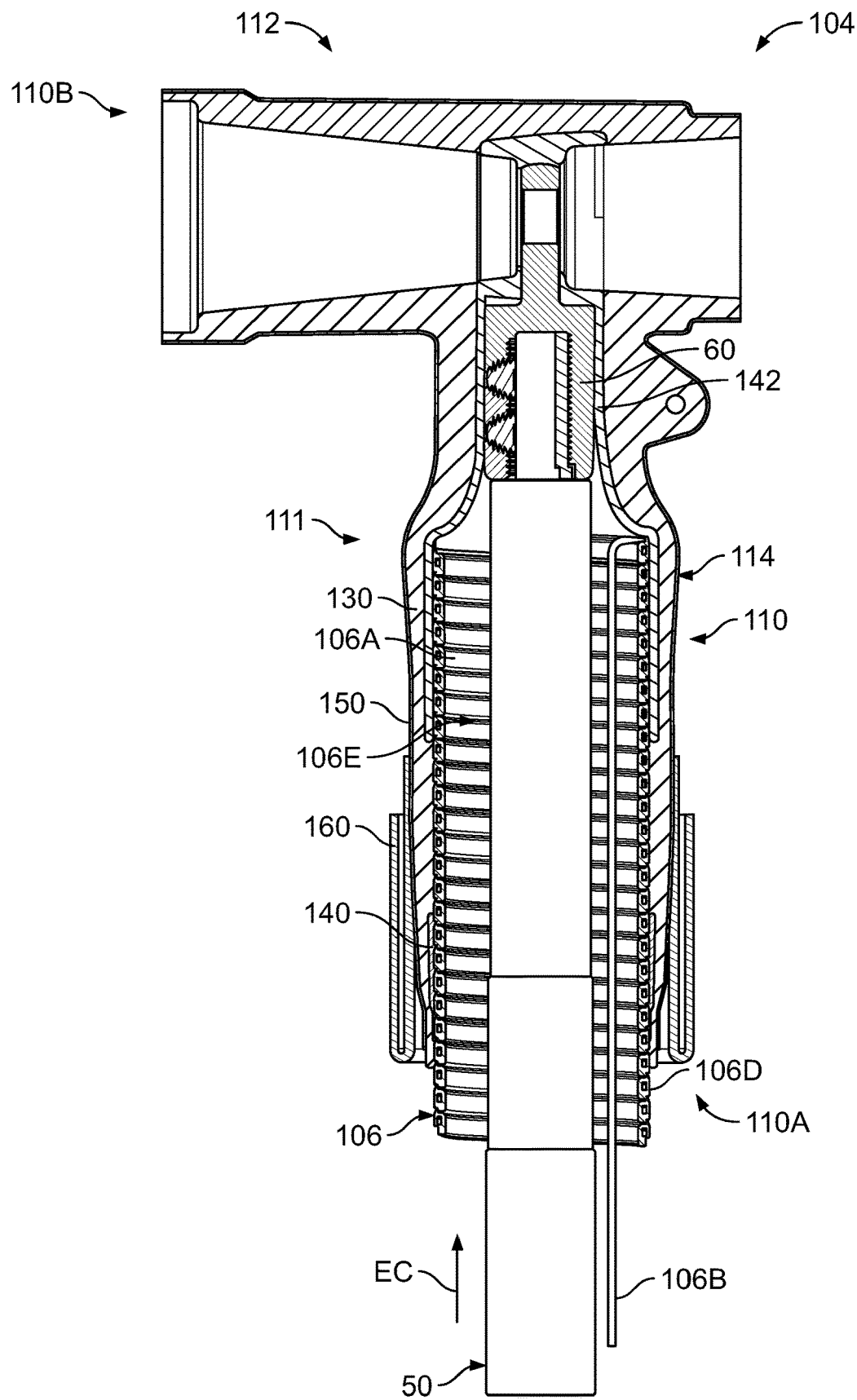
FIGS. 6 and 7 are cross-sectional views illustrating installation of the protective housing on the terminated cable.

In some embodiments, the housing 110 is packaged or provided as part of a pre-expanded housing assembly unit 104 including the housing 110 and a holdout device 106, as shown in FIGS. 3 and 6. In the pre-expanded housing assembly unit 104, a portion of the housing 110 is maintained in a radially expanded state or position by the holdout device 106. The housing 110 can be deployed from the holdout device 106 to contract about the cable 50 to form the terminated cable assembly 102. The pre-expanded housing assembly unit 104 may further include a rejacket release aid 108. In some embodiments, the pre-expanded housing assembly unit 104 and the connector 60 are provided as a pre-packaged kit of components for subsequent use and assembly by an installer (e.g., a field installer) using a method as described herein.

Figure 2:
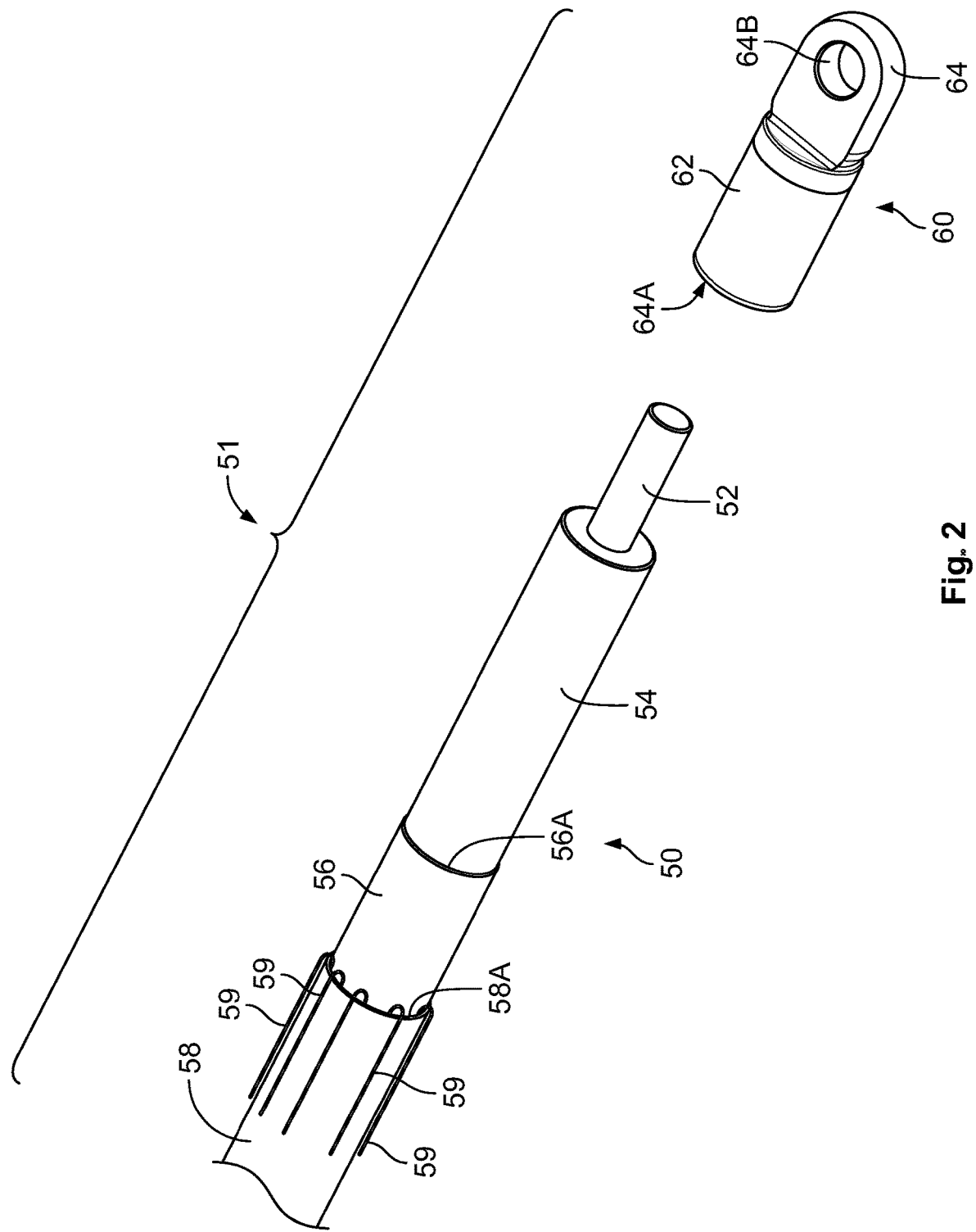
FIG. 2 is an exploded view of a terminated cable forming a part of the connection system of FIG. 1.

According to some embodiments, the cable 50 is a concentric neutral cable. According to some embodiments, the cable 50 is a low-voltage or medium-voltage (e.g., between about 5 and 46 kV) power transmission cable. As shown in FIG. 2, the cable 50 includes a primary electrical conductor 52, a polymeric insulation layer 54, a semiconductive layer 56, one or more neutral conductors 59, and a jacket 58, with each component being concentrically surrounded by the next. According to some embodiments and as shown, the neutral conductors 59 are individual wires, which may be helically wound about the semiconductive layer 56. The primary conductor 52 may be formed of any suitable electrically conductive materials such as copper (solid or stranded). The polymeric insulation layer 54 may be formed of any suitable electrically insulative material such as cross-linked polyethylene (XLPE) or EPR. The semiconductive layer 56 may be formed of any suitable semiconductive material such as carbon black with silicone. The neutral conductors 59 may be formed of any suitable material such as copper. The jacket 58 may be formed of any suitable material such as ethylene propylene diene monomer (EPDM).

The cable connector 60 may be formed of any suitable electrically conductive metal such as copper. In some embodiments (e.g., as illustrated), the connector 60 is a lug connector including a connector body or mounting portion 62 and a coupling portion, post or lug 64 extending from an end thereof. A lug hole 64A is defined in the lug 64. A conductor bore 62A is defined in the body to receive the exposed end section of the cable conductor 52. The cable connector 60 may be any suitable type of connector (e.g., crimp connector or shear bolt connector). The cable connector 60 may be secured to the cable conductor 52 by crimping, one or more clamping bolts (e.g., shear bolts) or any other suitable mechanism. The illustrated cable connector 60 is a shear bolt connector.

The housing 110 has a proximal end 110A and an opposing distal end 110B. The housing 110 includes a unitary housing body 114 and a tubular electrically insulating rejacketing layer or sleeve 160. The housing body 114 includes a tubular electrical insulation layer 130, a tubular semiconductive stress cone layer 140, a tubular semiconductive Faraday cage layer 142, and a tubular outer semiconductive layer 150. The layers 130, 140, 142, 150, and 160 form an integral unit. In some embodiments, the layers 130, 140, 142 are integrally molded, the layer 150 is bonded to the layer 130, and the rejacketing sleeve 160 is secured to the remainder of the housing body 114 by an interference fit.

The housing body 114 includes a tubular first leg 111 (extending from the proximal end 110A toward the distal end 110B) and a tubular second leg 112 (on the distal end 110B). The legs 111, 112 together form a T-shape and the housing 110 may be referred to as a T-shaped housing or T-shaped elbow housing.

The cable leg 111 extends from a cable entry end 111A to an opposing joint end 111B. The cable leg 111 defines a cable entrance opening 124 (at the cable entry end 111A) and a first or cable receiving bore 120. The cable receiving bore 120 is defined by a bore inner surface 122 and extends from and communicates with the cable entrance opening 124. The cable receiving bore 120 defines a cable bore axis A1-A1.

The connector leg 112 defines a connector bore 126 defining a connector bore axis A2-A2. The connector bore 126 includes a connector interface socket 126A and a plug socket 126B on laterally opposed sides of the cable receiving bore 120. The connector interface socket 126A and the plug socket 126B terminate at a connector interface opening 126C and a plug receiving opening 126D, respectively.

The connector bore 126 intersects the cable receiving bore 120 at the joint end 111B. The connector leg 112 extends transversely to the cable leg 111. In some embodiments and as illustrated, the connector leg 112 extends substantially perpendicular to the cable leg 111. The connector bore axis A2-A2 extends transversely to the cable bore axis A1-A1. In some embodiments and as illustrated, the connector bore axis A2-A2 extends substantially perpendicular to the cable bore axis A1-A1. In the illustrated embodiment, the housing 110 is a T-shaped elbow housing. In other embodiments, the housing 110 may be configured as an L-shaped elbow housing.

An integral ground connection feature 128 projects laterally outward from the cable leg 111.

According to some embodiments, the length L1 (FIG. 4) of the cable leg 111 is in the range from about 150 mm to 450 mm.

The insulation layer 130 includes an insulation layer cable leg 131 (forming the body of the cable leg 111) and an insulation layer connector leg 132 (forming the body of the connector leg 112). The insulation layer 130 extends from a proximal end 130A (at the cable leg proximal end 111A) to the distal end 110B. The insulation layer 130 defines the cable entrance opening 124. The insulation layer 130 includes a proximal end wall 136 facing in the proximal direction along the axis A1-A1. The insulation layer 130 includes an inner surface 130C forming portions of the bore inner surface 122. The proximal end of the insulation layer 130 defines the cable entrance opening 124. The insulation layer 130 has an outer surface 134.

Figure 4:
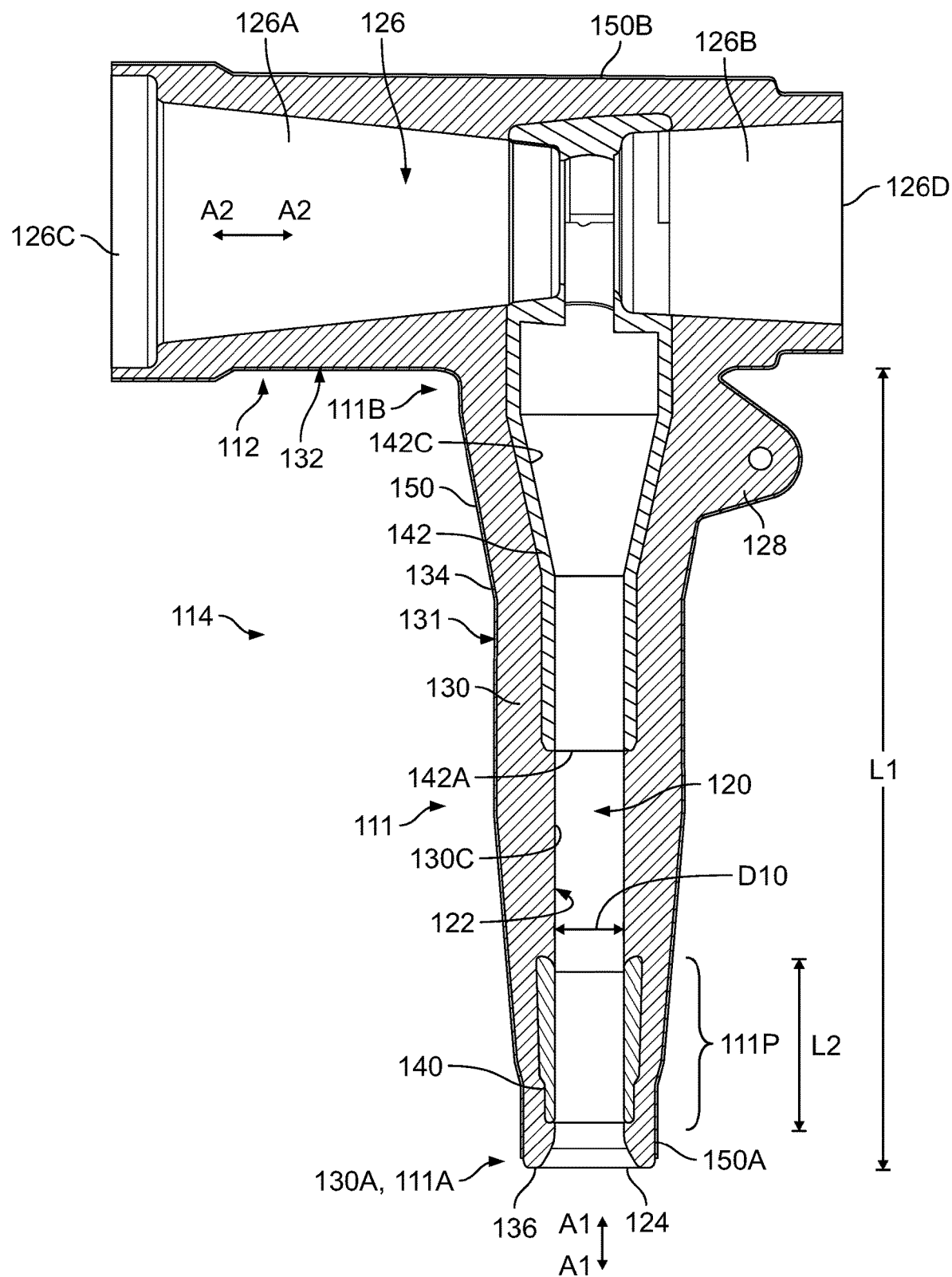
FIG. 4 is a cross-sectional view of a housing body forming a part of the protective housing.
Figure 5:
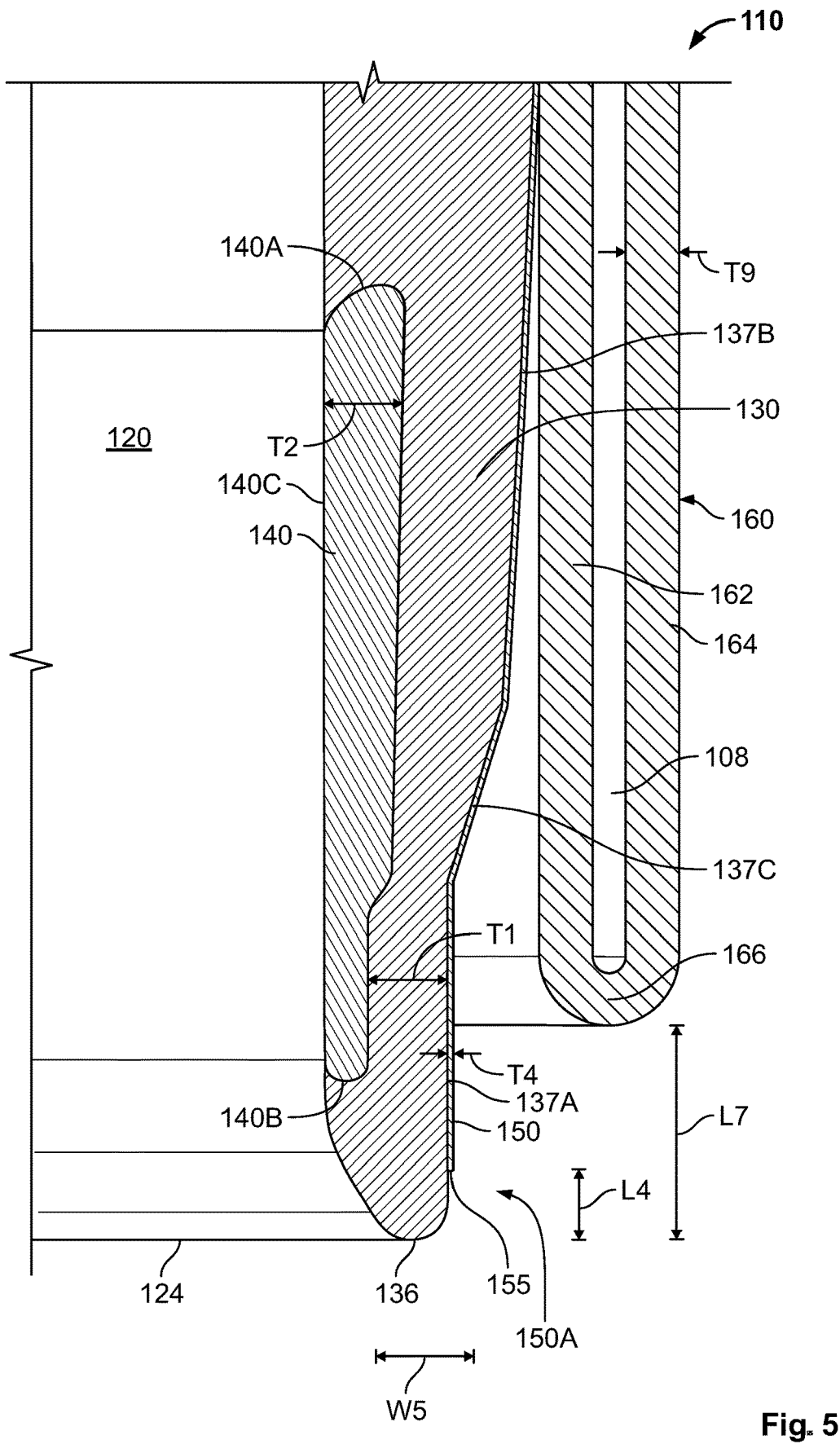
FIG. 5 is an enlarged, fragmentary, cross-sectional view of the housing body of FIG. 4.

In the electrical stress control section 111P, the insulation layer 130 has a relatively thick distal section 137B, a thinner proximal section 137A, and a tapered thickness section 137C that transitions from the thicker section 137B to the thinner section 137A. The taper provides desired elastic recovery force on a range of cable diameters. FIGS. 4 and 5 show the housing body 114 in its relaxed, as-molded configuration or shape.

The cable leg 111 includes an electrical stress control section 111P (FIG. 4) proximate the cable entrance opening 124 and surrounding the stress cone layer 140. The stress control section 111P may be axially coextensive with the stress cone 140. In use, the stress control section 111P surrounds a terminal edge 56A of the cable semiconductive layer 56 and adjacent portions of the cable fore and aft of the terminal edge 56A.

The insulation layer 130 can be formed of any suitable electrically insulative and elastically expandable material. According to some embodiments, the insulation layer 130 is formed of an elastomeric material. According to some embodiments, the insulation layer 130 is formed of ethylene propylene diene monomer (EPDM) rubber, liquid silicone rubber (LSR), or ethylene propylene rubber (EPR). In some embodiments, the insulation layer 130 is monolithic.

According to some embodiments, the insulation layer 130 is formed of a material having a Modulus at 100 percent elongation (M100) in the range of from about 0.4 to 1.5 MPa.

According to some embodiments, the nominal thickness T1 (FIG. 5) of the insulation layer 130 in the cable leg 131 in the stress control section 111P is at least 2 mm. In some embodiments, the thickness T1 is in the range from about 2 mm to 10 mm.

The stress control layer 140 extends from a proximal end 140A to a distal end 140B. The proximal end 140A is axially spaced apart from the cable entrance opening 124 (i.e., from the proximal end 130A). An inner surface 140C of the stress control layer 140 forms a portion of the bore inner surface 122. The outer surface of the stress cone layer 140 is bonded to the inner surface of the insulation layer 130.

The stress cone layer 140 may be formed of a suitable electrically semiconductive, elastically expandable material. According to some embodiments, the stress cone layer 140 is formed of an elastomeric material. According to some embodiments, the stress cone layer 140 is formed of liquid silicone rubber (LSR), formulations of EPDM, or ethylene propylene rubber (EPR). The elastomeric material may include an electrically conductive filler material such as carbon black, for example.

According to some embodiments, the stress cone layer 140 is formed of a material having a Modulus at 100 percent elongation (M100) in the range of from about 0.5 to 2 MPa.

According to some embodiments, the axial length L2 (FIG. 4) of the stress cone layer 140 is in the range from about 20 mm to 75 mm.

According to some embodiments, the thickness T2 (FIG. 4) of the stress cone layer 140 is in the range from about 4 mm to 10 mm.

The Faraday cage layer 142 extends from a proximal end 142A (in the cable receiving bore 120) to a distal end (surrounding the connector bore 126). The proximal end 142A is axially spaced apart from the stress cone layer 140. An inner surface 142C of the Faraday cage layer 142 forms a portion of the bore inner surface 122. The outer surface of the Faraday cage layer 142 is bonded to the inner surface of the insulation layer 130.

The Faraday cage layer 142 may be formed of a suitable electrically semiconductive, elastically expandable material. According to some embodiments, the Faraday cage layer 142 is formed of an elastomeric material. According to some embodiments, the Faraday cage layer 142 is formed of liquid silicone rubber (LSR), formulations of EPDM, or ethylene propylene rubber (EPR). The elastomeric material may include an electrically conductive filler material such as carbon black, for example.

According to some embodiments, the thickness of the Faraday cage layer 142 is in the range from about 2 mm to 8 mm.

According to some embodiments, the Faraday cage layer 142 is formed of a material having a Modulus at 100 percent elongation (M100) in the range of from about 0.5 to 2 MPa.

The outer semiconductive layer 150 serves as an electrical ground shield layer of the housing 110. The inner surface of the outer semiconductive layer 150 is bonded to the outer surface 134 of the insulation layer 130.

The insulation layer cable leg 131, the stress cone layer 140, a portion of the Faraday cage layer 142, and the portion of the outer semiconductive layer 150 covering the insulation layer cable leg 131 collectively constitute the cable leg 111. The insulation connector leg 132, a portion of the Faraday cage layer 142, and the portion of the outer semi-conductive layer 150 covering the insulation connector leg 132 collectively constitute the connector leg 112.

The outer semiconductive layer 150 (FIGS. 3, 4 and 5) fully circumferentially surrounds portions of each leg 131, 132 of the insulation layer 130. The outer semiconductive layer 150 extends axially from a proximal end 150A to an opposed distal end 150B. At the proximal end 150A, the semiconductive layer 150 forms and terminates at an annular terminal edge or terminus 155. In some embodiments, the proximal end 150A is located a prescribed axial truncation distance L4 (FIG. 5) from the proximal end 130A of the insulation layer 130 such that a tubular band or portion 134D of the outer surface 134 of the insulation layer 130 is not covered by the semiconductive layer 150. That is, the semiconductive layer 150 is truncated on the proximal end of the insulation layer 130. The tubular surface band 134D fully circumscribes the insulation layer cable leg 131. The tubular surface band 134D extends axially from the semiconductive layer terminal edge 155 to the insulation layer terminal end 130A. The truncation of the semiconductive layer 150 serves to form an electrical shield break.

According to some embodiments, the axial truncation distance L4 (FIG. 5; i.e., the width of the exposed portion 134D) is at least 1 mm. In some embodiments, the axial truncation distance L4 is in the range of from about 1 to 5 mm.

Additionally, the annular proximal end wall surface 136 of the insulation layer 130 is not covered by the outer semiconductive layer 150. According to some embodiments, the width W5 (FIG. 5) of the proximal end wall surface 136 is at least 7 mm. In some embodiments, the width W5 is in the range of from about 7 to 11 mm.

As will be appreciated from the foregoing description and FIG. 5, in some embodiments, the semiconductive layer 150 is spaced a substantial distance from the cable entrance opening 124 and does not intersect or abut the cable entrance opening 124 or the cable receiving bore 120 defined by the insulation layer 130. The length L4 and the width W5 combine (i.e., the sum of the dimensions) to provide an electrical separation distance or shield break distance from the semiconductive layer terminal edge 155 to the cable entrance opening 124. The semiconductive layer 150 does not contact the cable 50.

According to some embodiments, the shield break distance is at least 8 mm. In some embodiments, the shield break distance is in the range of from about 8 to 12 mm.

In some embodiments and as shown in FIG. 3, the outer semiconductive layer 150 substantially fully covers the outer surface 134 of the insulation layer cable leg 131 except on the exposed or noncovered surfaces 134D, 136. In some embodiments, the semiconductive layer 150 substantially fully covers the outer surface 134 of the insulation layer 130 except on the exposed or noncovered surfaces 134D, 136.

According to some embodiments, the thickness T4 (FIG. 5) of the semiconductive layer 150 is less than 3 mm. In some embodiments, the thickness T4 is in the range from about 0.1 mm to 3 mm. According to some embodiments, the thickness T4 of the semiconductive layer 150 is substantially uniform.

The outer semiconductive layer 150 may be formed of any suitable electrically semiconductive, elastically expandable material. According to some embodiments, the semiconductive layer 150 is formed of an elastomeric material. According to some embodiments, the semiconductive layer 150 is formed of liquid silicone rubber (LSR), formulations of EPDM, or ethylene propylene rubber (EPR). The elastomeric material may include an electrically conductive filler material such as carbon black, for example. According to some embodiments, the semiconductive layer 150 is formed of carbon black mixed with silicone. According to some embodiments, the semiconductive layer 150 is formed of carbon black mixed with EPDM.

According to some embodiments, the semiconductive layer 150 has a Modulus at 100 percent elongation (M100) in the range of from about 0.3 to 2 MPa.

Figure 7:
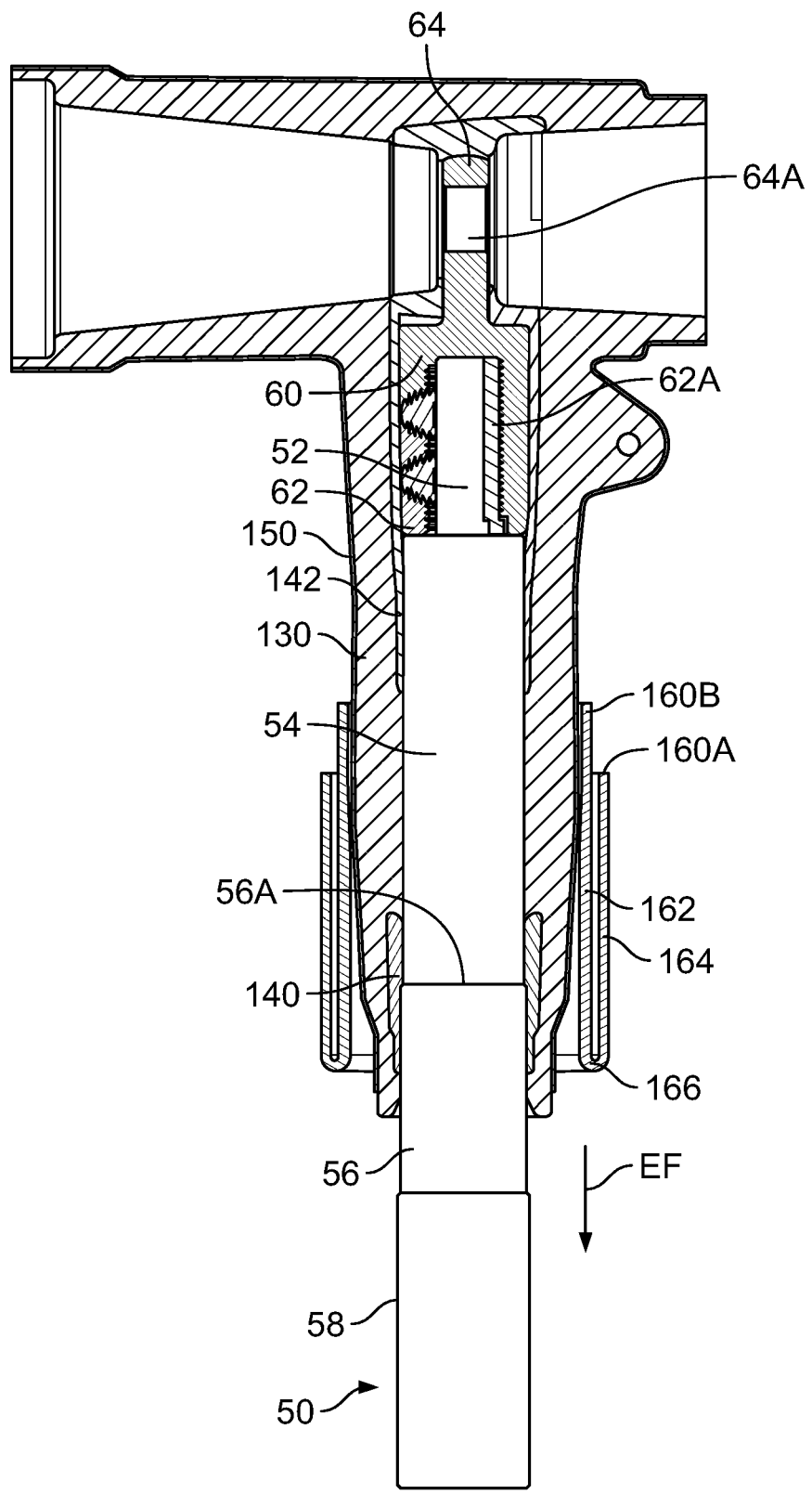

The electrically insulating rejacketing sleeve 160 extends from a proximal end 160A to a distal end 160B. The rejacketing sleeve 160 includes a base section 162 (at the end 160B) and an extension section 164 (at the end 160A). The base section 162 surrounds a portion of the cable leg 111. The sections 162, 164 are joined at a fold 166. In a stored configuration as shown in FIGS. 3 and 7, the extension section 164 is folded back and surrounds the base section 162.

The fold 166 is spaced inboard an axial fold inset distance L7 (FIG. 5) from the proximal end 130A of the insulation layer 130. According to some embodiments, the distance L7 is in the range of from about 3 to 18 mm.

The extension section 164 can be rolled or folded out and away from the base section 162 in a direction EF (FIG. 7) to a deployed configuration, as shown in FIG. 1. In the deployed configuration, the extension section 164 extends axially, in the proximal direction, beyond the proximal end 110A of the housing body 114. In the deployed configuration, the extension section 164 extends axially an extension distance L8 (FIG. 1) proximally beyond the proximal end 110A of the housing body 114. In some embodiments, the extension distance L8 is at least 30 mm. In some embodiments, the extension distance L8 is at in the range of from about 30 mm to 80 mm.

The rejacketing sleeve 160 can be formed of any suitable material. According to some embodiments, the rejacketing sleeve 160 is formed of an electrically insulating material. According to some embodiments, the rejacketing sleeve 160 is formed of an elastically expandable material. According to some embodiments, the rejacketing sleeve 160 is formed of an elastomeric material. According to some embodiments, the rejacketing sleeve 160 is formed of ethylene propylene diene monomer (EPDM) rubber. Other suitable materials may include neoprene or other rubber. According to some embodiments, the rejacketing sleeve 160 is monolithic.

According to some embodiments, the rejacketing sleeve 160 has a Modulus at 100 percent elongation (M100) in the range of from about 0.6 to 1.6 MPa.

According to some embodiments, the thickness T9 (FIG. 5) of the rejacketing sleeve 160 is in the range of from about 2 mm to 5 mm.

The housing 110 may further include a ground connector 115. The example ground connection 115 includes a metal clamp 115A and a conductive wire 115B. A clamp 115A is secured to the ground connection feature 128.

The holdout device 106 can be any suitable type of holdout device (which may also be referred to a removable support core or retainer device). The holdout device 106 has an outer surface 106D and defines a through passage or bore 106E. According to some embodiments, the holdout device 106 includes a flexible strip 106A helically wound to form a rigid cylinder and having a pull tab or end segment 106B extending through the bore 106E as illustrated, for example.

The holdout device 106 can be formed of any suitable material. According to some embodiments, the holdout device 106 is formed of a semi-rigid polymeric material. According to some embodiments, the holdout device 106 is formed of polypropylene, ABS, or PVC. The holdout device 106 may be factory installed.

When mounted on the holdout device 106, the housing 110 is maintained in an elastically radially expanded state or position. According to some embodiment, in the expanded state the housing 110 is expanded in the range of from about 200 to 400 percent of its relaxed diameter.

The rejacket release aid 108 may include a grease or other lubricate to assist in unfolding the extension section 164. In some embodiments, the rejacket release aid 108 includes a tubular mesh to retain the grease and/or reduce the contact surface area of the stored extension section 164.

The housing 110 may be manufactured using any suitable techniques. In some embodiments, the stress control layer 140 and the Faraday cage layer 142 are molded into the insulation layer 130 (e.g., by co-molding).

In some embodiments, the outer semiconductive layer 150 is applied to the outer surface 134 of the insulation layer 130 as a liquid that thereafter cures or dries after being applied. For example, the semiconductive layer 150 may be formed by mixing the semiconductive elastomer with a solvent and spraying the mixture onto the outer surface 134 of the insulation layer 130 to form a coating on the outer surface 134. The solvent evaporates to leave the semiconductive layer 150 bonded to the outer surface.

The rejacketing sleeve 160 and the release aid 108 (if any) are installed over the subassembly of the layers 130, 140, 142, 150.

The housing 110 is then expanded. The holdout device 106 is then inserted into the cable receiving bore 120 of the expanded housing. The housing 110 is then released to contract onto the holdout device 106.

Further aspects of the housing 110 will be discussed below in conjunction with the methods of use.

The terminated cable assembly 102 may be formed using methods as follow.

The cable 50 is prepared as shown in FIG. 2 such that a segment of each layer 54, 56, 58 extends beyond the next overlying layer. That is, the layers 54, 56, 58 may be cut back or stripped so that the cable conductor 52 extends beyond an annular cutback or terminal edge 54A of the insulation layer 54, the insulation layer 54 extends beyond an annular cutback or terminal edge 56A of the semiconductive layer 56, and the semiconductive layer 56 extends beyond an annular cutback or terminal edge 58A of the jacket layer 58. A suitable length of the neutral wires 59 may be retained to route to the electrical system ground G.

The mount portion 62 of the electrical connector 60 is secured to the primary conductor 52 to mechanically and electrically couple the electrical connector 60 to the primary conductor 52 as shown in FIG. 6. The assembly of the cable 50 and the connector 60 form a terminal cable 51.

With reference to FIG. 6, the terminated cable 51 is inserted into the pre-expanded unit 104 in an insertion direction EC substantially coincident with the cable bore axis A1-A1. More particularly, cable 50 is inserted through the holdout bore 106E, and thereby through the cable entrance opening 124 and into the cable receiving bore 120. According to some embodiments, the inside diameter of the holdout device 106 is greater than the outer diameters of the cable 50 and the connector 60 such that the inner diameter of the holdout device 106 is sufficient to receive the prepared cable 50 and the connector 60 without undue effort. According to some embodiments, the inner diameter of the holdout device 106 is at least as great as the outer diameter of the largest portion of the cable or connector that are to be received in the cable receiving bore 120. The subassembly 51 is inserted until the lug 64 of the connector 60 is positioned in the connector bore 126.

With the terminated cable 51 positioned in this manner, the holdout device 106 is then removed from the housing 110, thereby permitting the housing 110 to radially retract about the cable 50 and the connector 60 as shown in FIG. 7. More particularly, the removal of the holdout device 106 allows the elastomeric sleeves or layers of the shielded cable leg 131 to relax and radially retract about the cable 50 and the connector 60.

In the case of the illustrated holdout device 106, the spirally wound holdout device 106 is removed from the housing 110 by pulling the draw cord 106B of the strip 106A from the end proximate the connector 60 back through the holdout bore 106E in an axial direction EH away from the connector 60, to thereby progressively unravel the holdout device 106 (i.e., sequentially unravel each leading segment of the strip 106A). In this way, the holdout device 106 is axially progressively disintegrated or collapsed and the cable leg 111 of the housing 110 is permitted to axially progressively elastically radially contract onto the cable 50 from end 111B to end 111A. In this manner, the housing 110 is cold-applied and cold shrunk onto the cable 50 without axially displacing the housing 110 (i.e., without pushing the housing 110 axially onto the cable 50) and without requiring applied heat.

The extension section 164 of the rejacketing sleeve 160 is then rolled in direction EF off the cable leg 111 and onto the portion of the cable 50 projecting out beyond the proximal end 111A. The extension section 164 overlaps the cable jacket 58 (as shown in FIG. 1) and elastically radially contracts to engage and press against the cable jacket 58.

In some embodiments and with reference to FIG. 1, the cable layers and the housing 110 are relatively configured and positioned such that terminal edge 56A of the cable semiconductive layer 56 is located in the stress cone layer 140 (i.e., axially between the ends 140A and 140B), and the connector 60 is located in the Faraday cage layer 142 (as illustrated in FIG. 1, for example). The stress cone layer 140 engages the portions of the cable semiconductive layer 56 and the cable insulation 54 immediately adjacent the terminal edge 56A. The Faraday cage layer 142 engages the base of the connector 60, surrounds the terminal edge 54A of the cable insulation 54 and engages the portion of the cable insulation 54 immediately adjacent the terminal edge 54A.

The stress cone layer 140 engages and makes intimate contact with the surface of the cable insulation 54 and the surface of the cable semiconductive layer 56 at and on either side of the terminal edge 56A. The stress cone layer 142 serves to redistribute the voltage along the surface of the cable insulation 54 to reduce or prevent the degradation of the insulation 54 that might otherwise occur.

The Faraday cage layer 142 may form a Faraday cage to provide an equal potential volume about the connector 60 so that an electric field is cancelled in the surrounding air voids.

In some embodiments and with reference to FIG. 1, the cable layers and the extension section 164 are relatively configured and positioned such that terminal edge 58A of the cable jacket 58 is surrounded by the extension section 164 and is axially spaced apart from the cable leg end 111A outside of the cable bore 120.

The relaxed inner diameter D10 (FIG. 4) of the cable receiving bore 120 in the stress control section 111P of the cable leg 111 is less than the outer diameter D11 of the cable insulation layer 54. Therefore, at least the stress control section 111P exerts a persistent radially inwardly compressive or clamping force or pressure (due to elastic tension) onto the cable 50. The cable leg 111 thereby effects a tight seal at the interface between the cable layers 54, 56 and the inner surface 122. This seal can eliminate or reduce the presence of air between the cable layers 54, 56 and the inner surface 122. This seal can also protect the cable and the connector 60 from the ingress of environmental moisture. According to some embodiments the relaxed inner diameter D10 of the stress control section 111P is at least 5 percent less than the smallest diameter cable upon which the housing 110 is intended to be installed.

Similarly, the relaxed inner diameter D12 of the rejacketing sleeve 160 is less than the outer diameter of the cable jacket layer 58. Therefore, the rejacketing sleeve 160 exerts a persistent radially inwardly compressive or clamping force or pressure (due to elastic tension) onto the cable jacket layer 58. The rejacketing sleeve 160 thereby effects a tight seal at the interface between the cable layers 54, 56 and the rejacketing sleeve 160. This seal can also protect the cable and the splice from the ingress of environmental moisture. According to some embodiments the relaxed inner diameter D12 of the rejacketing sleeve 160 is at least 10 percent less than the jacket outer diameter of the smallest cable upon which the housing 110 is intended to be installed.

The terminated cable assembly 102 can then be pushed onto the equipment bushing 14 in a direction EP.

The electrical contact member 18 may be secured (e.g., screwed) onto the plug 16. The plug 16 can then be inserted into the socket 126B to close the opening 126D and to insert the electrical contact member 18 through the lug opening 64A. The plug 16 can then be rotated to screw the electrical contact member 18 into the female electrical contact 14B of the bushing 14 to secure the plug 16 and thereby the terminated cable assembly 102 to the bushing 14. In this manner, an electrical connection between the bushing 14 and the cable 50 (via the electrical contact member 18 and the connector 60) and a mechanical connection between the equipment and the terminated cable assembly 102 are formed. It will be appreciated that other coupling configurations may be used.

The terminated cable assembly 102 can then be pushed onto the equipment bushing 14 in a direction EP to form an electrical connection between the bushing 14 and the cable 50 (via the electrical contact member 18 and the connector 60) and a mechanical connection between the equipment and the terminated cable assembly 102.

The ground wire 115B can be connected to a system ground G to ground the semiconductive layer 150. The cable neutral wires 59 may also be connected to the system ground G. The grounding the cable neutral wires 59 ground the stress cone layer 140.

As discussed above, the outer semiconductive layer 150 has a much smaller thickness T4 than the thickness T1 of the insulation layer cable leg 131. In particular, the thickness T4 of the semiconductive layer 150 in the stress control section 111P of the cable leg 111 is relatively small and the vast majority of the bulk of the housing 110 at the stress control section 111P is formed by the insulation layer 130. According to some embodiments, the insulation layer thickness T1 is at least 10 times the semiconductive layer thickness T4 in at least the stress control section. The thickness T4 of the semiconductive layer 150 is exaggerated in the Figures for the purpose of explanation.

The provision of a thin semiconductive layer 150 enables the cable leg 111 to be constructed to have a larger cable range taking. This is because the insulating layer 130 can be formed of an elastomer having a lower elastic modulus than the elastic modulus of the semiconductive elastomer of the semiconductive layer 150.

By making the insulating layer 130 thicker, the cable leg 111 can also be configured to exert more radially inward sealing pressure on the cable 50. In particular, the thicker insulation layer 130 in the cable leg 111 will exert more radially inward sealing pressure on the cable 50 at the cable semiconductive layer cutback 56 where it is important to eliminate air pockets.

The thick elastic wall over the cable semiconductive layer terminal edge 56A creates pressure which squeezes out air voids between the housing 110 and the cable which increases electrical strength. An additional benefit is that the thick layer of insulation 130 with a thin layer of semiconductive coating 150 is resistant to splitting as compared to a standalone layer of semiconductive elastomer that extends down to the cable. Conductive LSR rubber has poor split resistance when molded as a single layer. Providing the semiconductive layer as a thin layer bonded to an insulating elastomer (insulating LSR, for example) that has high split resistance improves the overall strength and split resistance of the composite.

The independent stress cone layer 140 bonded (e.g., molded) to the overlying insulation layer 130 provides electrical stress control at the cable semiconductive layer cutback so that it is not necessary to extend the housing outer semiconductive layer 150 to engage the cable 50.

When the housing 110 is mounted on the cable 50 as described, the truncation of the semiconductive layer 150 and the exposed or noncovered surfaces 134D, 136 (i.e., the surfaces of the insulation layer 130 not covered by the semiconductive layer 150) define a gap between the semiconductive layer 150 and the cable semiconductive layer 56 that forms and serves an electrical shield break. The electrical shield break is formed between the semiconductive layer 150 and the cable semiconductive layer 56 and extends across the shield break distance L6. The semiconductive layer 150 does not contact the cable semiconductive layer 56. In some embodiments, the semiconductive layer 150 does not contact the cable 50.

The rejacketing sleeve 160 serves the rejacketing function of semiconductive elastomer layers found in prior art housings. As a result, the provision of the rejacketing sleeve 160 enables the use of a thin outer semiconductive layer 150 that terminates well before the cable jacket cutback 58A. The rejacketing sleeve 160 also permits the use of materials for the rejacketing layer (e.g., EPDM) that are better suited to the rejacketing purpose and/or less costly than a semiconductive layer elastomer.

The provision of a fold 166 in the rejacketing sleeve 160 permits the use of a shorter holdout device 106 and greater access to the cable bore 120 during installation of the housing 110 on the cable 50.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. An article comprising:
   a cold-shrinkable protective housing configured to be mounted on a terminated cable to form a terminated cable assembly, the terminated cable including a cable and a connector, the cold-shrinkable protective housing including:
      a housing body including a tubular cable leg and a tubular connector leg extending transversely to the cable leg, the housing body including a housing insulation layer formed of an electrically insulating elastomer; and
      an integral, tubular, electrically insulating rejacketing sleeve surrounding a portion of the cable leg;
   wherein:
      the connector leg defines a connector bore configured to receive the connector;
      the cable leg has a proximal end and an opposing distal end;
      the cable leg defines a cable entrance opening at the proximal end;
      the cable leg defines a cable receiving bore extending from the cable entrance opening to the connector bore at the distal end;
      the cable receiving bore extends transversely to the connector bore;
      the rejacketing sleeve includes a base section and an extension section;
      the base section surrounds a portion of the cable leg;
      the rejacketing sleeve is separately formed from the housing body and is secured to the housing body by an interference fit between the base section and the housing body; and
      the extension section is configured to extend or be extended in a proximal direction beyond the proximal end of the cable leg to surround a jacket of the cable.

2. The article of claim 1 wherein the extension section surrounds the cable leg and is configured to be rolled or folded away from the cable leg to surround the jacket of the cable.

3. An article comprising:
   a cold-shrinkable protective housing configured to be mounted on a terminated cable to form a terminated cable assembly, the terminated cable including a cable and a connector, the cold-shrinkable protective housing including:
      a housing body including a tubular cable leg and a tubular connector leg extending transversely to the cable leg, the housing body including:
         a housing insulation layer formed of an electrically insulating elastomer;
         a tubular stress cone layer bonded to an inner surface of the housing insulation layer and formed of an electrically conductive elastomer; and
         a tubular outer semiconductive layer bonded to an outer surface of the housing insulation layer, the outer semiconductive layer being formed of an electrically semiconductive elastomer;
   wherein:
      the connector leg defines a connector bore configured to receive the connector;
      the cable leg has a proximal end and an opposing distal end;

the cable leg defines a cable entrance opening at the proximal end;

the cable leg defines a cable receiving bore extending from the cable entrance opening to the connector bore at the distal end;

the cable receiving bore extends transversely to the connector bore;

the stress cone layer defines a portion of the cable receiving bore; and the stress cone layer is configured to engage and surround a terminal edge of a semiconductive layer of the cable.

4. The article of claim 3 wherein the outer semiconductive layer has a thickness in the range of from about 0.1 to 3 mm.

5. The article of claim 3 wherein the housing insulation layer has a thickness in the range of from about 2 to 10 mm in a stress control section of the cable leg.

6. The article of claim 3 wherein a thickness of the housing insulation layer in a stress control section of the cable leg is at least 10 times a thickness of the outer semiconductive layer.

7. The article of claim 3 wherein the outer semiconductive layer has an annular terminal edge that is located axially between the proximal end of the cable leg and the distal end of the cable leg and is spaced axially apart from the proximal end of the cable leg by an axial truncation distance to provide a shield break between the outer semiconductive layer and the cable entrance opening.

8. An article comprising:
a cold-shrinkable protective housing configured to be mounted on a terminated cable to form a terminated cable assembly, the terminated cable including a cable and a connector, the cold-shrinkable protective housing including:
a housing body including a tubular cable leg and a tubular connector leg extending transversely to the cable leg, the housing body including a housing insulation layer formed of an electrically insulating elastomer; and
an integral, tubular, electrically insulating rejacketing sleeve surrounding a portion of the cable leg;
wherein:
the connector leg defines a connector bore configured to receive the connector;
the cable leg has a proximal end and an opposing distal end;
the cable leg defines a cable entrance opening at the proximal end;
the cable leg defines a cable receiving bore extending from the cable entrance opening to the connector bore at the distal end;
the cable receiving bore extends transversely to the connector bore;
the rejacketing sleeve includes an extension section configured to extend or be extended in a proximal direction beyond the proximal end of the cable leg to surround a jacket of the cable;
the housing insulation layer forms at least a portion of the cable leg;
the protective housing includes a tubular stress cone layer bonded to the housing insulation layer proximate the cable entrance opening and formed of an electrically conductive elastomer; and
the stress cone layer defines a portion of the cable receiving bore and is configured to engage and surround a terminal edge of a semiconductive layer of the cable.

9. The article of claim 8 wherein the extension section surrounds the cable leg and is configured to be rolled or folded away from the cable leg to surround the jacket of the cable.

10. The article of claim 8 wherein the rejacket sleeve is formed of ethylene propylene diene monomer (EPDM).

11. The article of Claim 8 wherein the protective housing includes a tubular outer semiconductive layer bonded to an outer surface of the housing insulation layer, the outer semiconductive layer being formed of an electrically semiconductive elastomer.

12. The article of claim 8 further including a holdout device removably mounted within the cable receiving bore, wherein:
the holdout device is operative to maintain the cable leg in a radially expanded state until removed from the cable receiving bore; and
the protective housing and the holdout device collectively form a pre-expanded housing assembly unit.

13. The article of claim 8 wherein:
the housing insulation layer forms an insulation layer cable leg forming a part of the cable leg; and
the protective housing includes a tubular outer semiconductive layer bonded to an outer surface of the cable leg, the outer semiconductive layer being formed of an electrically semiconductive elastomer.

14. The article of claim 13 wherein the outer semiconductive layer has a thickness in the range of from about 0.1 to 3 mm.

15. The article of claim 13 wherein the housing insulation layer has a thickness in the range of from about 2 to 10 mm in a stress control section of the cable leg.

16. The article of claim 13 wherein a thickness of the housing insulation layer in a stress control section of the cable leg is at least 10 times a thickness of the outer semiconductive layer.

17. The article of claim 13 wherein the outer semiconductive layer has an annular terminal edge that is located axially between the proximal end of the cable leg and the distal end of the cable leg and is spaced axially apart from the proximal end of the cable leg by an axial truncation distance to provide a shield break between the outer semiconductive layer and the cable entrance opening.

18. The article of claim 13 wherein the outer semiconductive layer is formed of a mixture including:
at least one of liquid silicone rubber (LSR), ethylene propylene diene monomer (EPDM), and ethylene propylene rubber (EPR); and
an electrically conductive filler.

19. The article of claim 13 wherein the housing insulation layer is formed of a material including at least one of liquid silicone rubber (LSR), ethylene propylene diene monomer (EPDM), and ethylene propylene rubber (EPR).

20. The article of claim 13 wherein the outer semiconductive layer has a lower Modulus at 100 percent elongation (M100) than the housing insulation layer.

* * * * *